United States Patent [19]
Suga et al.

[11] Patent Number: 4,792,588
[45] Date of Patent: Dec. 20, 1988

[54] POLYETHYLENE COMPOSITION

[75] Inventors: Michiharu Suga, Iwakuni; Hideo Ishikawa, Ohtake; Yoshinori Akana, Iwakuni; Junichi Yoshitake, Kasuga; Masayuki Kondoh, Iwakuni, all of Japan

[73] Assignee: Mitsui Petrochemical Industries, Ltd., Tokyo, Japan

[21] Appl. No.: 19,317

[22] PCT Filed: Jun. 26, 1986

[86] PCT No.: PCT/JP86/00325

§ 371 Date: Apr. 17, 1987

§ 102(e) Date: Apr. 17, 1987

[87] PCT Pub. No.: WO87/00184

PCT Pub. Date: Jan. 15, 1987

[30] Foreign Application Priority Data

Jun. 27, 1985 [JP] Japan ................................ 60-141321
Mar. 3, 1986 [JP] Japan ................................ 61-44201

[51] Int. Cl.$^4$ ...................... C08L 23/04; C08L 23/06
[52] U.S. Cl. ...................................... 525/240; 525/268
[58] Field of Search ........................................ 525/240

[56] References Cited

U.S. PATENT DOCUMENTS 4,311,752 1/1982 Diedrich et al. ................... 526/348
4,336,352 6/1982 Sakurai et al. ........................ 525/53

FOREIGN PATENT DOCUMENTS 57-177036 10/1982 Japan .
58-008712 1/1983 Japan .
58-008713 1/1983 Japan .
59-126446A 7/1984 Japan .

Primary Examiner—Carman J. Seccuro
Attorney, Agent, or Firm—Sherman and Shalloway

[57] ABSTRACT

A polyethylene composition having excellent melt moldability which substantially comprises an ultrahigh-molecular-weight polyethylene having a molecular weight of, for example, at least about 1,650,000 and a low-molecular-weight to high-molecular-weight polyethylene having a molecular weight of, for example, about 1500 to about 360,000. The composition is produced by a multi-stage polymerization process involving a step of producing the ultrahigh-molecular-weight polyethylene and a step of producing the low-molecular-weight to high-molecular-weight polyethylene.

8 Claims, No Drawings

POLYETHYLENE COMPOSITION

TECHNOLOGICAL FIELD

This invention relates to a polyethylene composition, and more specifically, to a polyethylene composition having excellent melt moldability which substantially comprises ultrahigh-molecular-weight polyethylene having a molecular weight of, for example, at least about 1,650,000 and low-molecular-weight to high-molecular-weight polyethylene having a molecular weight of, for example, about 1,500 to about 360,000.

BACKGROUND TECHNOLOGY

Ultrahigh-molecular-weight polyethylene has better impact strength, abrasion resistance, chemical resistance and tensile strength than general high-molecular-weight polyethylenes, and its utility as engineering plastics has been on an increase. However, the ultrahigh-molecular-weight polyethyene has a much higher melt viscosity and lower flowability than the general-purpose polyethylenes. Hence, it has the defect of poor moldability and is extremely difficult to mold by extrusion or injection molding.

Accordingly, in most cases, articles from the ultrahigh-molecular-weight polyethylene are presently produced by compression molding. Some articles, such as rods, are produced only at very low speeds by extrusion molding.

Previously, as a method of improving the melt moldability of ultrahigh-molecular-weight polyethylene, the mixing of the ultrahigh-molecular-weight polyethylene with low-molecular-weight or high-molecular-weight polyethylene was proposed.

Japanese patent publication No. 27064/1971 discloses an abrasion-resistant polyethylene resin composition comprising polyethylene having an average molecular weight of at least 500,000 and 20 to 50% by weight of polyethylene having a density of at least 0.940 and an average molecular weight of 30,000 to 120,000.

Japanese Patent Publication No. 41,309/1983 discloses a polyethylene composition comprising 85 to 50 parts by weight of polyethylene having a viscosity average molecular weight of 500,000 to 1,500,000 and 15 to 50 parts by weight of particulate ultrahigh-molecular-weight polyethylene having a viscosity average molecular weight of at least 1,000,000 and a particle size smaller than 10 mesh.

Japanese Laid-Open Patent Publication No. 177,036/1982 discloses an ultrahigh-molecular-weight polyethylene composition having improved moldability comprising 100 parts by weight of ultrahigh-molecular-weight polyethylene having a molecular weight of at least 1,000,000 and 10 to 60 parts by weight of low-molecular-weight polyethylene having a molecular weight of 5,000 to 20,000. The specification of this Laid-Open Publication states that the moldability of the ultrahigh-molecular-weight polyethylene composition is such that in the production of a slab having a thickness of 50 mm by compression molding, it required a molding cycle of 200° C.×2 hours whereas the ultrahigh-molecular-weight polyethylene alone required a molding cycle of 200° C.×3 hours; and in ram extrusion molding method, the pipe extrusion speed likewise increased to 10 cm/min. from 5 cm/min.

The moldability of the above ultrahigh-molecular-weight polyethylene composition is improved as stated above, but should be further improved.

Japanese Laid-Open Patent Publication No. 126,446/1984 discloses an ultrahigh-molecular-weight polyethylene resin composition comprising 95 to 50 parts by wight of an ultrahigh-molecular-weight polyethylene resin and 5 to 50 parts by weight of a general-purpose polyolefin resin. The specification of this patent publication discloses a composition comprising a silane-modified polyethylene resin having a melt index of 2.5 or 5.0 g/10 min. as an actual example of the general-purpose polyolefinic resin. The moldability of the composition is described in Table 1 of this specification, but it is not that the moldability is sufficiently good with regard to all compositions The above polyethylene resin compositions are all prepared by mixing ultrahigh-molecular-weight polyethylene with polyethylene or a polyolefin having a lower molecular weight.

On the other hand, Japanese Laid-Open patent publication No. 94593/1979 (corresponding to U.S. Pat. No. 4,414,369) discloses a process for producing a polyolefin having a broad molecular weight distribution by polymerizing an olefin in the presence of a solvent and hydrogen using a Ziegler-type catalyst supported on a solid carrier and having enhanced activity; characterized in that a plurality of reactors are used, a major olefin monomer and at least one olefin comonomer are continuously fed into a first-stage reactor and copolymerized while a gaseous phase containing an inert gas is present in the upper portion of the reactor, the polymerization reaction mixture in which high-molecular-weight polymer particles are dispersed in the solvent is transferred continuously by a difference in pressure into a second-stage reactor consisting of a vertical stirred vessel kept at a lower pressure than the first-stage reactor without substantially separating part of the components in the mixture and without using a forced transferring means, in the second-stage stirred vessel, the polymerization is continuously carried out in the presence of the major olefin monomer and hydrogen while a gaseous phase is present in the upper part of the stirred vessel to form a polymer having a lower molecular weight than the polymer obtained in the first stage, and the polymerization reaction mixture containing the resulting polymer particles dispersed in the solvent is continuously withdrawn from the second stirred vessel, and the polymer is recovered from it.

Japanese patent publication No. 10,724/1984 (corresponding to U.S. Pat. No. 4,336,352) discloses a process for continuously producing polyethylenes having different molecular weights in a multiplicity of stages in three or more polymerization reactors connected in series. The purpose of this process is to produce polyethylene having excellent physical properties and moldability. The specification of this patent publication states in column 5, lines 28-30 that in order to achieve this purpose, the proportion of ultrahigh-molecular-weight polyethylene having a viscosity average molecular weight of at least 1,000,000 should be limited to 1 to 10%, preferably 1 to 7%, based on the total amount of the polyethylenes formed.

Japanese Laid-Open patent Publication No. 141409/1982 discloses a process for producing polyethylene which comprises polymerizing ethylene or copolymerizing ethylene with an alpha-olefin using a catalyst comprising the reaction product of a magnesium compound and a titanium halide and an organoaluminum compound; characterized in that the following three polymerization steps are carried out in any desired order, step (a): a step of forming an ethylene polymer or copolymer having an alpha-olefin content of not more than 10% by weight and an intrinsic viscosity [η] of 0.3 to 1.5, step (b): a step of forming an ethylene polymer or copolymer having an alpha-olefin content of not more than 30% by weight and an intrinsic viscosity [η] of 1.5 to 7, step (c): a step of forming an ethylene polymer or copolymer having an alpha-olefin content of not more than 30% by weight and an intrinsic viscosity [η] of 7 to 40, and the polymerization reactions are carried out while the amounts polymerized in the above steps, in terms of the weight ratio of step (a):step (b):step (c), are adjusted to 1:0.1–1.5:0.01–1.2.

Japanese Laid-Open patent Publication No. 8712/1983 discloses a process for producing an ethylenic copolymer which comprises copolymerizing ethylene and an alpha-olefin using a catalyst system obtained from (A) a solid catalyst component containing at least a magnesium atom, a halogen atom and a titanium atom and (B) an organoaluminum compound in two stages; characterized in that (1) in at least one of said steps, 80 to 20 parts by weight of a copolymer having a high load melt index of 0.03 to 10 g/10 min. and a density of 0.890 g/cm³ to 0.905 g/cm³ is produced, (2) in the second step, 20 to 80 parts by weight of a copolymer having a melt index of 10 to 5000 g/10 min. and a density of 0.905 to 0.940 g/cm³ is produced, ps thereby to produce a copolymer having a melt index of 0.02 to 30 g/10 min. and a density of 0.890 to 0.935 g/cm³.

The specification of this publication discloses that the high load melt index was measured at a temperature of 190° C. under a load of 21.6 kg in accordance with JIS K-6760.

Japanese Laid-Open patent Publication No. 8713/1983 discloses a process for producing an ethylenic copolymer by polymerization in a multiplicity of stages using the same catalyst as described in the above-cited Japanese Laid-Open patent Publication No. 8713/1983, which comprises (1) producing 80 to 20 parts by weight of a copolymer of ethylene with propylene and/or butene-1 having a high load melt index of 0.03 to 10 g/10 min. and a density of 0.890 to 0.935 g/cm² in at least one of said stages, and (2) producing 20 to 80 parts by weight of a copolymer of an ethylene/alpha-olefin copolymer having a melt index of 10 to 5000 g/10 min. and a density of 0.890 to 0.940 g/cm³ in which the content of alpha-olefins having 5 to 12 carbon atoms in alpha-olefins having at most 12 carbon atoms as comonomers is at least 30 mole %, thereby to form a copolymer having a melt index of 0.02 to 30 g/10 min. and a density of 0.890 to 0.936 g/cm³.

Japanese Laid-Open patent Publication No. 120605/1984 discloses a process for producing an ultrahigh-molecular-weight polyethylene-type resin having improved moldability which comprises polymerizing monomers using a Ziegler-type catalyst comprising an organometallic component and a solid catalyst component containing a transition metal component in at least two stages in which the monomer compositions and the hydrogen concentrations are different; characterized in that in one of said stages, propylene or a monomeric mixture comprising propylene as a main component, or butene-1 or a monomeric mixture comprising butene-1 as a main component is polymerized in the presence of hydrogen to produce 2 to 60%, based on the entire polymers, of a polypropylene or polybutene-1 component, and that in at least one of the other stages, ethylene or a monomeric mixture comprising ethylene as a main component is polymerized in the substantial absence of hydrogen to produce 98 to 40%, based on the entire polymers, of an ultrahigh-molecular-weight polyethylene component.

British Pat. No. 1,174,542 discloses a process for the preparation of a homo- or co-polymer of ethylene by a gaseous phase polymerization, or by a suspension polymerization in which the dispersion medium is in contact with a gaseous phase of ethylene or a mixture comprising ethylene and up to 10% by weight of an alphaolefin that contains from 3 to 15 carbon atoms, which process comprises preparing from 5% to 30% by weight of the total polymer in the presence of from 0% to 10% of hydrogen, calculated on the total volume of the gaseous phase, and preparing from 70% to 95% by weight of the total polymer in the presence of from 20% to 80% of hydrogen, calculated on the total volume of the gaseous phase, both stages of the polymerization being carried out at a temperature within the range of from 50° C. to 120° C. and a pressure of 10 atmospheres gauge, in the presence of a catalyst which is present in the first stage in an amount sufficient for both stages, said catalyst comprising (a) in the case of a suspension polymerization, from 0.05 to 3.0 millimols per liter of dispersion medium, or in the case of a polymerization in the gaseous phase, from 0.05 to 0.3 millimol per 0.5 liter of reactor volume, of a chlorine-containing trivalent compound, and (b) from 0.1 to 3.0 millimols of aluminum per liter of dispersion medium or reactor volume, in the form of an aluminum trialkyl having the general formula AlR₃ in which each R represents a hydrocarbon radical that contains from 4 to 40 carbon atoms, or in the form of the reaction product of an aluminium trialkyl or an aluminium alkyl hydride with a diolefin that contains from 4 to 20 carbon atoms.

It is an object of this invention to provide a novel ultrahigh-molecular-weight polyethylene composition.

Another object of this invention is to provide a polyolefin composition having excellent melt moldability, particularly very good melt extrusion moldability, without impairing the excellent mechanical properties, such as high impact resistance or strength properties, inherent to ultrahigh-molecular-weight polyethylene.

Further objects and advantages of this invention will become apparent from the following description.

DISCLOSURE OF THE INVENTION

According to this invention, the above objects and advantages of the invention are achieved by a polyethylene composition characterized in that:

(1) said composition is produced by a multistage polymerization process in which in the presence of a Ziegler-type catalyst formed from (A) a highly active titanium catalyst component comprising magnesium, titanium and halogen as essential components and (B) an organoaluminum compound catalyst component, ethylene or ethylene and a small amount of an alpha-olefin are polymerized in at least one polymerization step to form ultrahigh-molecular-weight polyethylene having an intrinsic viscosity of at least 12 dl/g, and ethylene or ethylene and a small amount of an alpha-olefin are polymerized in the presence of hydrogen in another polymerization step to form low-molecular-weight to high-molecular-weight polyethylene having an intrinsic viscosity of 0.1 to 5 dl/g, (2) said ultrahigh-molecular-weight polyethylene has an intrinsic viscosity, measured in decalin at 135° C., of at least 12 dl/g, and said low-molecular-weight to high-molecular-weight polyethylene has an intrinsic viscosity, measured in decalin at 135° C., of 0.1 to 5 dl/g, (3) the proportion of said ultrahigh-molecular-weight polyethylene is in the range of 20 to 95% by weight based on the total weight of said ultrahigh-molecular-weight polyethylene and said low-molecular-weight to high-molecular-weight polyethylene, and (4) said polyethylene composition consists substantially of said ultrahigh-molecular-weight polyethylene and said low-molecular-weight to high-molecular-weight polyethylene and has an intrinsic viscosity $[\eta]c$, measured in decalin at 135° C., of 10 to 50 dl/g.

The polyethylene composition produced by the above process (1) in which polyethylenes having different molecular weights defined in (2) and (3) in different proportions are produced in a multiplicity of stages, and finally having a very high molecular weight as defined in (4) above has not been known heretofore. It has neither been known heretofore that a polyethylene composition having such a high molecular weight shows very good melt moldability.

The ultrahigh-molecular-weight polyethylene, as referred to herein, has an intrinsic viscosity $[\eta]u$, measured in decalin at 135° C., of at least 12 dl/g. Advantageously, the ultrahigh-molecular-weight polyethylene has an intrinsic viscosity $[\eta]u$ of preferably at least 15 dl/g, especially preferably 20 to 55 dl/g.

The other low-molecular-weight to high-molecular-weight polyethylene, as referred to herein, has an intrinsic viscosity $[\eta]h$, measured in decalin at 135° C., of 0.1 to 5 dl/g. Preferably, the low-molecular-weight to high-molecular-weght polyethylene has an intrinsic viscosity $[\eta]h$ of 0.2 to 4.5 dl/g.

The polyethylene in this invention includes not only a homopolymer of ethylene, but also a copolymer of ethylene with a minor proportion of an alpha-olefin such as propylene, 1-butene, 1-pentene, 1-hexene, 1-octene, 1-decene, 1-dodecene, 4-methyl-1-pentene or 3-methyl-1-pentene. The other alpha-olefin in a minor proportion is copolymerized in a proportion of usually not more than 10 mole %, preferably not more than 6 mole %.

When the $[\eta]u$ of the ultrahigh-molecular-weight polyethylene is 15 dl/g, it has a viscosity average molecular weight of about 1,650,000. When the $[\eta]h$ of the low-molecular-weight to high-molecular-weight polyethylene is 0.1 to 5 dl/g, it has a viscosity average molecular weight of about 1,500 to about 360,000.

The proportions of the ultrahigh-molecular-weight polyethylene and the low-molecular-weight to high-molecular-weight polyethylene are such that the proportion of the ultrahigh-molecular-weight polyethylene is 20 to 95% by weight based on the total weight of the two polyethylenes, and the proportion of the low-molecular-weight to high-molecular-weight polyethylene is 80 to 5% by weight based on the total weight of the two polymers. The preferred proportions are such that the ultrahigh-molecular-weight polyethylene occupies 25 to 80% by weight of the total weight of the two polyethylenes.

The polyethylene compositon of this invention consists substantially of the ultrahigh-molecular-weight polyethylene and the low-molecular-weight to high-molecular-weight polyethylene in the aforesaid proportions, and has an intrinsic viscosity $[\eta]c$, measured in decalin at 135° C., of 10 to 50 dl/g, preferably 13 to 30 dl/g.

Investigations of the present inventors have shown that the polyethylene composition of this invention preferably has a melting torque T (kg-cm) of not more than 30 kg-cm and $[\eta]c$ and T have the relation $T \leq [\eta]c$. The melting torque T is measured by using a JSR curelastometer (made by Imanaka Machine Industry K. K.) under conditions involving a temperature of 240° C., a pressure of 5 kg/cm$^2$, an amplitude of ±3° and a vibration number of 6 CPM.

More preferably, the compositon of this invention has a melting torque T of not more than 24 kg-cm and $[\eta]c$ and T have the relation $T \leq 0.8 \times [\eta]c$.

It has been found that the polyethylene composition of this invention can be produced by a multistage polymerization method to be described below in which an olefin is polymerized in a multiplicity of steps in the presence of a catalyst formed from a specific highly active solid titanium catalyst component and an organoaluminum compound catalyst component. The multistage polymerization method is carried out by polymerizing ethylene or ethylene and a small amount of an alphaolefin in a multiplicity of stages in the presence of a Ziegler-type catalyst formed from (A) a highly active titanium catalyst component comprising magnesium, titanium and halogen as essential components and (B) an organoaluminum compound catalyst component. Specifically, in at least one polymerization step, ultrahigh-molecular-weight polyethylene having an intrinsic viscosity of at least 15 dl/g is formed, and in another polymerization step, ethylene or ethylene and a small amount of an alpha-olefin are polymerized in the presence of hydrogen to form low-molecular-weight to high-molecular-weight polyethylene having an intrinsic viscosity of 0.1 to 5 dl/g.

The specific Zielger-type catalyst used is a catalyst of specific properties formed basically from a solid titanium catalyst component and an organoaluminum compound catalyst component. For example, a highly active catalyst component in the form of a fine powder having a narrow particle size distribution and an average particle diameter of about 0.01 to 5 microns in which several fine spherical particles adhere firmly to one another is suitably used a the solid titanium catalyst component. The highly active finely divided titanium catalyst component having such properties can be produced, for example, by strictly adjusting the precipitation conditions when a magnesium compound in the form of a liquid and a titanium compound in the form of a liquid are contacted with each other to precipitate a solid product in the preparation of the solid titanium catalyst component disclosed in Japanese Laid-Open patent Publication No. 811/1981. For example, when in the method disclosed in the above patent publication, a hydrocarbon solution of magnesium chloride and a higher alcohol is mixed with titanium tetrachloride at a low temperature and then the mixture is heated to about 50° to 100° C. to precipitate a solid product, the precipitation is carried out in the co-presence of a tiny amount, for example about 0.01 to 0.2 mole, of a monocarboxylic acid ester and under intense stirring conditions. If further required, the product may be washed with titanium tetrachloride. As a result, a solid catalyst component having satisfactory activity and particle properties can be obtained. Such a catalyst component, for example, contains about 1 to about 6% by weight of titanium and has a halogen/titanium atomic ratio of from about 5 to about 90 and a magnesium/titanium atomic ratio of from about 4 to about 50.

Fine spherical particles having a narrow particle size distribution and an average particle diameter of usually 0.01 to 5 microns, preferably 0.05 to 3 microns, which is obtained by subjecting the slurry of the solid titanium catalyst component prepared as above to a shearing treatment at high speeds, can also be suitably used as the highly active finely divided titanium catalyst component. A specific method of the high-speed shearing treatment is to treat the slurry of the solid titanium catalyst component in an inert gaseous atmosphere for a proper period of time by using a commercial homomixer. At this time, in order to prevent a reduction in catalyst performance, it is possible to employ a method in which an equimolar amount, to titanium, of an organoaluminum compound is added in advance. There can also be used a method in which the treated slurry is filtered on a sieve to remove coarse particles. By these methods, the aforesaid highly active finely divided titanium catalyst component in the form of fine particles can be obtained.

The polyethylene compsotion of this invention can be produced by using the above highly active finely divided titanium catalyst component and the organoaluminum compound catalsyt component and optionally an electron donor, ethylene or ethylene and a small amount of another alpha-olefin are polymerized in slurry in a hydrocarbon medium such as pentane, hexane, heptane or kerosene usually at a temperature of 0° to 100° C. in at least two stages. Examples of suitable organoaluminum compound catalyst components are trialkyl aluminums such as triethyl aluminum and triisobutyl aluminum, dialkyl aluminum chlorides such as diethyl aluminum chloride and diisobutyl aluminum chloride, alklyl aluminum sesquichlorides such as ethyl aluminum sesquichloride, and mixtures of these.

In the multi-stage polymerization process for ethylene or ethylene and a small amount of the other alpha-olefin, a multi-stage polymerization apparatus is used in which at least two polymerization vessels are connected usually in series, and for example, a two-stage polymerization method, a three-stage polymerizaion method, an n-stage polymerization method are carried out. It is also possible to perform the multi-stage polymerization method in a single polymerization vessel by a batchwise method. In at least one polymerization vessel in the multi-stage polymerization process, it is necessary to form a specific amount of ultrahigh-molecular-weight polyethylene. The polymerization step of forming the ultrahigh-molecular-weight polyethylene may be a first polymerization step, an intermediate polymerization step, or a final polymerization step. Or it may be formed in two or more stages. From the standpoint of the polymerization treatment operations and the controlling of the physical properties of the resulting polymer, it is preferred to form the ultrahigh-molecular-weight polyethylene in the first polymerization step. In this polymerization step, it is necessary to form ultrahigh-molecular-weight polyethylene having an intrinsic viscosity $[\eta]u$ (measured in decalin at 135° C.) of at least 12 dl/g, preferably at least 15 dl/g, by polymerizing 20 to 95% by weight of ethylene or ethylene and a small amount of the alpha-olefin to be polymerized in the entire steps. More preferably, ultrahigh-molecular-weight polyethylene having an intrinsic viscosity $[\eta]u$ of 20 to 55 dl/g, especially 25 to 50 dl/g, is formed by polymerizing 25 to 80% by weight of ethylene or ethylene and a small amount of the alpha-olefin to be polymerized in the entire polymerization steps. The effects of the polyethylene composition of this invention described above cannot be achieved if the intrinsic viscosity $[\eta]u$ of the resulting ultrahigh-molecular-weight polyethylene formed in the polymerization step is less than 12 dl/g, or the proportion of the ultrahigh-molecular-weight polyolefin formed in the polymerization step is outside the range of 20 to 95% by weight.

In the polymerization step of forming the ultrahigh-molecular-weight polyethylene in the multistage polymerization process, the polymerization is carried out in the presence of a catalyst composed of (A) the highly active titanium catalyst component and (B) the organoaluminum compound catalyst. The polymerization can be carried out by a gaseous phase polymerization method or a liquid phase polymerization method. In either case, the polymerization step of forming the ultrahigh-molecular-weight polyethylene is carried out optionally in the presence of an inert medium. For example, the gaseous phase polymerization method may optionally be carried out in the presence of a diluent composed of the inert medium, and the liquid phase polymerization method may optionally be carried out in the presence of a solvent composed of the inert medium.

In the polymerization step of forming the ultrahigh-molecular-weight polyethylene, it is advisable to use about 0.001 to about 20 milligram-atom, particularly about 0.005 to about 10 milligram-atom, of the highly active titanium catalyst component (A) calculated as titanium atom per liter of the medium and the organoaluminum compound catalyst component in an Al/Ti atomic ratio of from about 0.1 to about 1000, particularly from about 1 to about 500, as the catalyst. The temperature used in the polymerization step of forming the ultrahigh-molecular-weight polyethylene is usually about $-20°$ to about 120° C., preferably about 0° to about 100° C., especially preferably about 5° to about 95° C. The pressure in the polymerization reaction is within a range in which the liquid phase polymerization or the gaseous phase polymerization is possible, for example within the range of atmospheric pressure to about 100 kg/cm$^2$, preferably atmospheric pressure to about 50 kg/cm$^2$. The polymerization time in the polymerization step may be prescribed such that the amount of the ultrahigh-molecular-weight polymer formed is at least about 1000 g, preferably at least about 3000 g, per milligram atom of titanium in the highly active titanium catalyst component. In order to form the ultrahigh-molecular-weight polyethylene in the above polymerization step, it is preferable to perform the polymerization reaction in the absence of hydrogen. It is also possible to isolate the polymer in an atmosphere of an inert medium after the polymerization and store it.

Examples of the inert medium that can be used in the polymerization step of forming the ultrahigh-molecular-weight polyethylene include aliphatic hydrocarbons such as propane, butane, pentane, hexane, heptane, octane, decane and kerosene; alicyclic hydrocarbons such as cyclopentane and cyclohexane, aromatic hydrocarbons such as benzene, toluene and xylene, halogenated hydrocarbons such as dichloroethane, methylene chloride and chlorobenzene, and mixtures thereof. Use of the aliphatic hydrocarbons is desirable.

In the above manufacturing process, the remainder of the olefins are polymerized in the presence of hydrogen in a polymerization step other than the polymerization step of forming the ultrahigh-molecular-weight polyethylene. If the polymerization step of forming the ultrahigh-molecular-weight polyethylene is the first-stage polymerization step, the above polymerization step is the second or subsequent polymerization step. When this polymerization step is performed after the polymerization step of forming the ultrahigh-molecular-weight polyethylene, polyethylene containing the ultrahigh-molecular-weight polyethylene is fed to the polymerization step. If the above step is performed after a polymerization step other than the polymerization step of forming the ultrahigh-molecular-weight polyethylene, low-molecular-weight to high-molecular-weight polyethylene formed in the preceding step is fed to this step. In any case, the polymerization is carried out successively. At this time, starting ethylene or ethylene and a small amount of the other alpha-olefin, and hydrogen are fed into this polymerization step. When this step is the first-stage polymerization step, the catalyst composed of the highly active titanium catalyst component (A) and the organoaluminum compound catalyst component (B) is fed to this polymerization step. If this step is the second or subsequent polymerization step, the catalyst contained in the polymerization reaction mixture formed in the preceding stage may be directly used, or as required, the highly active titanium catalyst component (A) and/or the organoaluminum compound catalyst component (B) can be additionally supplied.

The proportion of hydrogen fed in each polymerization step other than the polymerization step of forming the ultrahigh-molecular-weight polyethylene is usually 0.01 to 50 moles, preferably 0.05 to 30 moles, per mole of the olefins fed to the polymerization step.

Preferably, the concentrations of the catalyst components in the polymerization reaction mixture in a polymerization vessel in each of the polymerization steps other than the polymerization steps of forming the ultrahigh-molecular-weight polyethylene are preferably adjusted so that the proportion of the treated catalyst, calculated as titanium atoms, is about 0.001 to about 0.1 milligram atom, preferably about 0.005 to about 0.1 milligram atom, and the Al/Ti atomic ratio of the polymerization system is from about 1 to about 1000, preferably from about 2 to about 500. For this purpose, the organoaluminum compound catalyst component (B) may be additionally supplied as required. Hydrogen, an electron donor, a halogenated hydrocarbon, etc,. may be present in the polymerization system in order to adjust the molecular weight, molecular weight distribution, etc. of the polymer.

The polymerization temperature is within a range in which slurry polymerization or gaseous-phase polymerization can be performed, and is at least about 40° C., preferably about 50° to about 100° C. The polymerization pressure that can be recommended is, for example, atmospheric pressure to about 100 kg/cm$^2$, especially atmospheric pressure to about 50 kg/cm$^2$. The polymerization time is desirably prescribed such that the amount of the polymer formed is at least about 1000 g, especially at least about 5000 g, per milligram atom of titanium in the titanium catalyst component.

The polymerization steps other than the polymerization step of forming the ultrahigh-molecular-weight polyethylene may be carried out likewise by a gaseous-phase polymerization method or a liquid-phase polymerization method. Different polymerization methods may be employed in different polymerization steps. A slurry suspension polymerization method is preferably used as the liquid-phase polymerization method. In any case, the polymerization in the above polymerization step is carried out usually in the presence of an inert medium. For example, the gaseous-phase polymerization method may be performed in the presence of a diluent composed of the inert medium, and the liquid-phase slurry suspension polymerization method may be carried out in the presence of a solvent composed of the inert medium. The inert medium may be the same as those exemplified hereinabove with regard to the polymerization step of forming the ultrahigh-molecular-weight polyethylene.

The polymerization reaction is carried out such that the polyethylene composition obtained in the finalstage polymerization step has an [η]c of usually 10 to 50 dl/g, preferably 13 to 40 dl/g, especially preferably 13 to 30 dl/g.

The multi-stage polymerization process may be carried out batchwise, semi-continuously, or continuously.

The above multi-stage polymerization process is applicable to the homopolymerization of ethylene or copolymerization of a major amount of ethylene with a minor amount of another alpha-olefin. Examples of the other alpha-olefin are propylene, 1-butene, 1-pentene, 1-hexene, 1-octene, 1-decene, 1-dodecene, 4-methyl-1-pentene and 3-methyl-1-pentene. The other alpha-olefin is used in a small amount of usually not more than 10 mole %, especially not more than 6 mole %, so that it can be copolymerized with ethylene.

The polyethylene composition of this invention can be molded into various articles in accordance with known melt-molding methods.

It is possible to add to the polyethylene composition of this invention additives normally used for polyolefins, such as heat stabilizers, weatherability stabilizers, pigments, dyes, lubricants, inorganic fillers or reinforcing agents such as carbon black, talc and glass fibers, fire retardants and neutron shielding agents within ranges which do not impair the objects of this invention.

EFFECTS OF THE INVENTION

The polyethylene composition of this invention shows very good melt moldability without impairing the excellent mechanical properties such as impact strength, abrasion resistance, chemical resistance and tensile strength inherently possessed by ultrahigh-molecular-weight polyethylene. Accordingly, from the polyethylene composition, a round rod having a diameter of 20 to 200 mm and articles with a cross-sectional shape of complex profiles can easily be molded by, for example, extrusion molding under low loads and low resin pressures. Furthermore, by compression molding, a thin sheet having a thickness of 2 to 5 mm, the production of which has previously encountered many problems such as the tendency to form an insufficiently pressed portion due to poor deaeration, can be molded easily from the polyethylene composition of this invention.

[EXAMPLES]

The following examples illustrate the present invention more specifically. The present invention, however, is not limited at all by these examples unless it departs from the essence of the invention.

The physical properties in the present specification were measured as shown below.

Measuring methods $[\eta]$: Intrinsic viscosity measured in decalin at 135° C.

Melting torque: The stress torque of a molten sample which is measured by using a JSR curelastometer (made by Imagawa Machine Industry K. K.) at a temprature of 240° C., a pressure of 5 kg/cm$^2$ with an amplitude of ±3° and a vibration number of 6 CPM.

Amount of abrasion loss: Two kilograms of abrasive grains (A#60) and 3.5 kg of water were mixed and put in a container A. Six test pieces C (75×24, 5×6 mm) (two of which were standard pieces) fixed to a shaft B were rotated at a rotating speed of 1400 rpm at 20° C. for 20 hours, and the amount of their abrasion was measured.

Tensile tests YS: in accordance with ASTM D638
 TS: in accordance with ASTM D638
 EL: in accordance with ASTM D638
Dynstat impact strength:
 Test piece: 3×5×15 cm
 Tester: Dynstat tester made by Toyo Seiki Seisakusho.

The solid titanium catalyst component used in the present examples was synthesized as follows:

Anhydrous magnesium chloride (47.6 g; 0.5 mole), 0.25 liter of decane and 0.23 liter (1.5 moles) of 2-ethylhexyl alcohol were reacted at 130° C. for 2 hours to form a uniform solution. Then, 7.4 ml (50 mmoles) of ethyl benzoate was added. The uniform solution was added dropwise to 1.5 liters of TiCl$_4$ kept at −5° C. with stirring over 1 hour. The reactor used was a 3-liter glass separable flask, and the stirring speed was adjusted to 950 rpm. After the dropwise addition, the temperature was raised to 90° C., and the reaction was carried out for 2 hours at 90° C. After the reaction, the solid portion was collected by filtration and thoroughly washed with hexane to obtain a highly active titanium catalyst component in the form of a fine powder. The catalyst component contained 3.8 wt. % of titanium atom.

EXAMPLE 1

Continuous polymerization was carried out using a continuous two-stage polymerization apparatus comprised of two 220-liter polymerization vessels connected to each other in series. The polymerization vessel in the first stage (to be abbreviated as the polymerization vessel) of the continuous two-stage polymerization apparatus was charged with 130 liters of n-hexane, and the temperature was elevated to 40° C. The polymerization vessel 1 was then continuously fed with 35 liters/hr of n-hexane, 35 mM/hr of triethyl aluminum, 0.8 milligram-atom/hr, as titanium atom, of the titanium catalyst component, and 7.2 Nm$^3$/hr of ethylene gas. By using a pump, the polymerization reaction mixture in slurry formed in the polymerization vessel 1 was sent to the polymerization vessel in the subsequent stage (abbreviated as the polymerization vessel 2). The level of the polymerization vessel 1 was maintained at 130 liters. The polymerization pressure in the polymerization vessel 1 at this time was 3.0 kg/cm$^2$ G.

In addition to the polymerization reaction mixture slurry sent from the polymerization vessel 1, 25 liters/hr of n-hexane and 2.4 Nm$^3$/hr of ethylene gas were continuously introduced into the polymerization vessel 2. Furthermore, a suitable amount of hydrogen gas was added, and the mole ratio of ethylene to hydrogen in the gaseous-phase portion was adjusted to 1:3. The slurry formed by the polymerization reaction was intermittently withdrawn from the bottom portion of the polymerization vessel by using a timer valve and the level of the polymerization vessel 2 was maintained at 120 liters. In the polymerization vessel 2, the polymerization temperature was 80° C., and the polymerization pressure was 7.8 kg/cm$^2$-G. The resulting polymer was separated from the solvent by a centrifugal separator and dried in a stream of N$_2$. The results are shown in Table 2.

EXAMPLES 2 TO 4 AND COMPARATIVE EXAMPLES 1 to 5

Example 1 was repeated except that the polymerization conditions were changed as shown in Table 1, and the proportions of the ultrahigh-moelcular-weight polyethylene and the low-molecular-weight or high-molecular-weight polyethylene obtained by polymerization and their molecular weights were changed. The results are shown in Table 2.

EXAMPLE 5 AND COMPARATIVE EXAMPLES 1 to 5

Example 1 was repeated except that the polymerization conditions were changed as described in Table 1. The results are shown in Table 2.

REFERENTIAL EXAMPLES 1 to 3

The properties of commercial ultrahigh-molecular-weight weight polyethylenes (Hizex Million ® 145M, 240M and 340M produced by Mitsui Petrochemical Industries, Ltd.) were measured under the same conditions, and the results are shown in Table 3.

TABLE 1

| | Polymerization conditions | | | | | | | | | |
|---|---|---|---|---|---|---|---|---|---|---|
| | Example | | | | | Comparative Example | | | | |
| | 1 | 2 | 3 | 4 | 5 | 1 | 2 | 3 | 4 | 5 |
| Polymerization conditions in the 1st stage | | | | | | | | | | |
| Fine powdery Ti catalyst (mg-atom) | 0.8 | 0.8 | 0.8 | 0.8 | 0.8 | 0.8 | 0.8 | 0.8 | 0.8 | 0.8 |
| Organoaluminum compound (mmole) | 35 | 35 | 35 | 35 | 35 | 35 | 35 | 35 | 35 | 35 |
| Temperature (°C.) | 40 | 50 | 50 | 40 | 50 | 60 | 20 | 40 | 70 | 55 |
| Pressure (kg/cm$^2$-G) | 3.0 | 3.7 | 3.5 | 2.7 | 3.8 | 4.0 | 2.8 | 2.7 | 6.0 | 3.6 |
| Rate of feeding ethylene gas (Nl/hr) | 7200 | 5280 | 4800 | 4800 | 6430 | 7760 | 800 | 6720 | 4800 | 2880 |
| Polymerization conditions in the 2nd stage | | | | | | | | | | |
| Temperature (°C.) | 80 | 80 | 80 | 80 | 80 | 80 | 80 | 80 | 80 | 80 |

TABLE 1-continued

| Polymerization conditions | Example | | | | | Comparative Example | | | | |
|---|---|---|---|---|---|---|---|---|---|---|
| | 1 | 2 | 3 | 4 | 5 | 1 | 2 | 3 | 4 | 5 |
| Pressure (kg/cm$^2$-G) | 7.8 | 13.4 | 15.1 | 11.2 | 7.8 | 14.7 | 8.6 | 6.9 | 12.8 | 15.3 |
| Rate of feeding ethylene gas (Nl/hr) | 2400 | 4320 | 4800 | 4800 | 3170 | 240 | 7200 | 2880 | 4800 | 6270 |
| H$_2$/ethylene mole ratio in the gaseous phase | 3/1 | 8/1 | 8/1 | 5/1 | 3/1 | 8/1 | 1/1 | 0.02/1 | 5/1 | 8/1 |
| Amount of the polyethylene composition yielded (kg/hr) | 12 | 12 | 12 | 12 | 12 | 10 | 10 | 12 | 12 | 12 |

TABLE 2

| Polyethylene composition | Ex. 1 | Ex. 2 | Ex. 3 | Ex. 4 | Ex. 5 |
|---|---|---|---|---|---|
| [η]μ of the ultrahigh-molecular-weight polyethylene | 35.5 | 30.0 | 29.7 | 41.2 | 33.8 |
| [η]h of the low-molecular-weight to high-molecular-weight polyethylene | 1.0 | 0.4 | 0.4 | 0.8 | 1.0 |
| Properties of the polyethylene composition | | | | | |
| Content of the ultrahigh-molecular-weight polyethylene (wt. %) | 75 | 55 | 50 | 50 | 67 |
| Content of the low-molecular-weight to high-molecular-weight polyethylene (wt. %) | 25 | 45 | 50 | 50 | 33 |
| [η]c (dl/g) | 26.9 | 16.7 | 15.0 | 20.6 | 22.8 |
| Melting torque T (kg-cm) | 23.8 | 10.0 | 10.0 | 16.1 | 16.3 |
| T/[η]c (kg-cm-g/dl) | 0.88 | 0.60 | 0.67 | 0.78 | 0.71 |
| Amount of abrasion loss (mg) | 84 | 96 | 108 | 82 | 108 |
| Tensile tests | | | | | |
| (YS) (kg/cm$^2$) | 256 | 297 | 305 | 271 | 280 |
| (TS) (kg/cm$^2$) | 409 | 292 | 244 | 443 | 399 |
| (EL) (%) | 266 | 208 | 131 | 352 | 253 |
| Dynstat impact strength (kg-cm/cm$^2$) | 91 | 71 | 68 | 78 | 83 |

| | CEx. 1 | CEx. 2 | CEx. 3 | CEx. 4 | CEx. 5 |
|---|---|---|---|---|---|
| [η]c of the ultrahigh-molecular-weight polyethylene | 22.1 | 45.1 | 30.0 | 11.6 | 15.5 |
| [η]h of the low-molecular-weight to high-molecular-weight polyethylene | 0.4 | 2.0 | 7.0 | 0.8 | 0.4 |
| Properties of the polyethylene composition | | | | | |
| Content of the ultrahigh-molecular-weight polyethylene (wt. %) | 97 | 10 | 70 | 50 | 30 |
| Content of the low-molecular-weight to high-molecular-weight polyethylene (wt. %) | 3 | 90 | 30 | 50 | 70 |
| [η]c (dl/g) | 21.3 | 6.16 | 23.2 | 6.11 | 3.65 |
| Melting torque T (kg-cm) | 52.9 | 8.0 | 35.0 | 1.8 | 5.0 |
| T/[η]c (kg-cm-g/dl) | 2.39 | 1.30 | 1.51 | 0.29 | 1.37 |
| Amount of abrasion loss (mg) | 80 | 301 | 118 | 202 | 351 |
| Tensile tests | | | | | |
| (YS) (kg/cm$^2$) | 245 | * | 244 | * | * |
| (TS) (kg/cm$^2$) | 412 | 293 | 516 | 290 | 216 |
| (EL) (%) | 247 | 2 | 298 | 2 | 2 |
| Dynstat impact strength (kg-cm/cm$^2$) | 85 | 30 | 82 | 35 | 23 |

| | REx. 1 | REx. 2 | REx. 3 |
|---|---|---|---|
| [η]c of the ultrahigh-molecular-weight polyethylene | 145 M | 240 M | 340 M |
| [η]h of the low-molecular-weight to high-molecular-weight polyethylene | | | |
| Properties of the polyethylene composition | | | |
| Content of the ultrahigh-molecular-weight polyethylene (wt. %) | 100 | 100 | 100 |
| Content of the low-molecular-weight to high-molecular-weight polyethylene (wt. %) | — | — | — |
| [η]c (dl/g) | 8.3 | 16.7 | 21.1 |
| Melting torque T (kg-cm) | 16 | 45 | 56 |
| T/[η]c (kg-cm-g/dl) | 1.93 | 2.69 | 2.65 |
| Amount of abrasion loss (mg) | 120 | 92 | 79 |
| Tensile tests | | | |
| (YS) (kg/cm$^2$) | 235 | 220 | 215 |
| (TS) (kg/cm$^2$) | 415 | 440 | 455 |
| (EL) (%) | 400 | 380 | 350 |
| Dynstat impact strength (kg-cm/cm$^2$) | 81 | 95 | 77 |

*Measurement impossible

We claim:

1. A polyethylene composition characterized in that:

(1) said composition is produced by a multistage polymerization process in which in the presence of a Ziegler-type catalyst formed from (A) a highly active titanium catalyst component comprising magnesium, titanium and halogen as essential components and (B) an organoaluminum compound catalyst component, ethylene or ethylene and a small amount of an alpha-olefin are polymerized in at least one polymerization step to form ultrahigh-molecular-weight polyethylene having an intrinsic viscosity of at least 12 dl/g, and ethylene or ethylene and a small amount of an alpha-olefin are polymerized in the presence of hydrogen in another polymerization step to form low-molecular-weight to high-molecular-weight polyethylene having an intrinsic viscosity of 0.1 to 5 dl/g, (2) said ultrahigh-molecular-weight polyethylene has an intrinsic viscosity, measured in decalin at 135° C., of at least 12 dl/g, and said low-molecular-weight to high-molecular-weight polyethylene has an intrinsic viscosity, measured in decalin at 135° C., of 0.1 to 5 dl/g, (3) the proportion of said ultrahigh-molecular-weight polyethylene is in the range of 20 to 95% by weight based on the total weight of said ultrahigh-molecular-weight polyethylene and said low-molecular-weight to high-molecular-weight polyethylene, and (4) said polyethylene composition consists substantially of said ultrahigh-molecular-weight polyethylene and said low-molecular-weight to high-molecular-weight polyethylene and has an intrinsic viscosity $[\eta]c$, measured in decalin at 135° C., of 10 to 50 dl/g.

2. The composition set forth in claim 1 wherein the intrinsic viscosity of the ultrahigh-molecular-weight polyethylene is at least 15 dl/g.

3. The composition set forth in claim 1 wherein the intrinsic viscosity of the ultrahigh-molecular-weight polyethylene is 20 to 55 dl/g.

4. The composition set forth in claim 1 wherein the intrinsic viscosity of the low-molecular-weight to high-molecular-weight polyethylene is 0.2 to 4.5 dl/g.

5. The composition set forth in claim 1 wherein the ultrahigh-molecular-weight polyethylene occupies 25 to 80% by weight of the total weight of the ultrahigh-molecular-weight polyethylene and the low-molecular-weight to high-molecular-weight polyethylene.

6. The composition set forth in claim 1 which has an intrinsic viscosity of 13 to 30 dl/g.

7. The composition set forth in claim 1 which has a melting torque (T) of not more than 30 kg-cm, and in which T and the intrinsic viscosity $[\eta]c$ have the relation $T \leq [\eta]c$.

8. The composition set forth in claim 1 which has a melting torque (T) of not more than 24 kg-cm, and in which T and the intrinsic viscosity $[\eta]c$ have the relation $T \leq 0.8 \times [\eta]c$.

* * * * *